United States Patent Office 2,843,555
Patented July 15, 1958

2,843,555

ROOM TEMPERATURE CURING ORGANO-POLYSILOXANE

Charles A. Berridge, Cohoes, N. Y., assignor to General Electric Company, a corporation of New York No Drawing. Application October 1, 1956
Serial No. 612,952

8 Claims. (Cl. 260—18)

This invention is concerned with organopolysiloxane compositions convertible to the cured, solid, elastic state at room temperature. More particularly, the invention relates to an organopolysiloxane composition convertible at room temperature, for instance, at temperatures ranging from about 20° to 40° C., to the cured, solid, elastic state, said composition comprising (a) a linear, fluid organopolysiloxane containing terminal silicon-bonded hydroxy groups and having an average of about two organic groups per silicon atom, (b) an alkyl silicate, and (c) a metallic salt of an organic carboxylic acid, in which the metallic ion is selected from the class consisting of lead, tin, zirconium, antimony, iron, cadmium, barium, calcium, titanium, bismuth, and manganese.

In the past, organopolysiloxanes convertible to the cured, solid, elastic state have been cured by the application of heat and the use of chemical curing agents, such as benzoyl peroxide, tertiary butyl perbenzoate, etc. The temperatures required for effecting adequate cure have ranged from about 150° C. to as high as 250° to 300° C. and have required extensive periods of time, not only in the mold but also in the subsequent heat aging out of the mold to bring out the ultimate cure of the organopolysiloxane. There are many applications in which it is impractical to heat the organopolysiloxane convertible to the cured, solid, elastic state.

Unexpectedly, I have discovered that I am able to effect cure of an organopolysiloxane to the solid, elastic state by employing a combination of ingredients which effect cure at room temperature of the organopolysiloxane (either with or without fillers), and the cure thereby obtained is a durable one and is able to withstand elevated temperatures of about 150° to 250° C. for extended periods of time. The means whereby this room temperature cure is obtained is due to the concomitant presence of both an alkyl silicate and a certain group of metallic salts of an organic carboxylic acid. It was entirely unexpected and in no way could have been predicted that the combined presence of the latter two ingredients would effect room temperature cure, or any cure for that matter, of the convertible organopolysiloxane for the reason that attempts to employ separately either of these two ingredients, namely, the alkyl silicate or the metallic salt of the organic monocarboxylic acid, failed to give any cure of the organopolysiloxane.

The type of linear, fluid organopolysiloxane convertible to the cured, solid, elastic state used in the practice of the present invention is critical and must have end groups composed of silicon-bonded hydroxyl groups. For this purpose, I have found that starting materials corresponding to the general formula (R'R''SiO)$_n$ are most suitable for making the convertible hydroxy-containing organopolysiloxane (which, for brevity, will be used to describe organopolysiloxanes containing silicon-bonded hydroxyl groups and are convertible to the cured, solid, elastic state), where R' and R'' are organic radicals selected from the class consisting of alkyl radicals (e. g., methyl, ethyl, propyl, butyl, hexyl, etc.), aryl radicals (e. g., phenyl, diphenyl, naphthyl, etc.), alkaryl radicals (e. g., tolyl, xylyl, ethylphenyl. etc.), aralkyl radicals (e. g., benzyl phenylethyl, etc.), haloaryl radicals (e. g., chlorophenyl, tetrachlorophenyl, difluorophenyl, etc.), alkenyl radicals (e. g., vinyl, allyl, etc., which are advantageously present in amounts less than 5 to 10 percent of the total number of silicon-bonded organic radicals in the starting materials), and where $n$ is an integer equal to at least 3. e. g., from about 3 to 10 or more, depending upon the organic group in the starting organopolysiloxane.

The above-described starting cyclic organopolysiloxanes are eminently suitable for preparing the convertible hydroxy-containing organopolysiloxanes used in the practice of the present invention because of the ability to readily obtain terminal silanol groups. In general, it is desirable and in some respects critical that of the organic groups present in the organopolysiloxanes, lower alkyl groups, specificaly methyl groups, constitute at least 50 percent, preferably from about 70 to 100 percent, of the total number of organic groups attached to silicon by carbon-silicon linkages. For this purpose, I have found that in making the convertible organopolysiloxane fluids, cyclic polymers of dimethylsiloxane are advantageously used for the purpose. Among such cyclic polymers may be mentioned, for instance, hexamethylcyclotrisiloxane, octamethylcyclotetrasiloxane, decamethylcyclopentasiloxane, etc. Obviously, mixtures of these cyclic organopolysiloxanes may be employed as long as the number of silicon-bonded methyl groups constitutes a major proportion of the total number of organic groups. Thus, one may employ, for instance, a mixture of octamethylcyclotetrasiloxane and a cyclic polymer of ethyl methylsiloxane having the formula $$\left[(CH_3)(C_2H_5)SiO\right]_n$$

where $n$ has the meaning above, mixtures of cyclic polymers of dimethylsiloxane with cyclic polymers of diphenyl siloxane, cyclic methyl phenyl siloxanes, cyclic methyl vinyl siloxanes, etc. When employing cyclic polymers of dimethylsiloxane with other cyclic polymers in which the organic groups of the latter cyclic polymers are short, such as silicon-bonded ethyl and vinyl groups, the molar ratio of the latter two aliphatic hydrocarbons may be higher than when using longer chain aliphatic groups (e. g., from 3 to 6 carbon atoms in the chain) with the cyclic methyl polysiloxanes.

In preparing the hydroxy-containing organopolysiloxane fluid from the starting cyclic organopolysiloxane, the latter (which includes mixtures of cyclic organopolysiloxanes) is advantageously heated at temperatures of about 125° to 150° C. with small amounts of a siloxane rearrangement catalyst (about 0.001 to 0.01 percent by weight, based on the weight of the cyclic organopolysiloxane) such as potassium hydroxide, tetrabutyl phosphonium hydroxide, etc. The temperature and time at which this heating will take place will vary depending upon such factors as the type of organopolysiloxane employed, the siloxane rearrangement catalyst used, the concentration of the catalyst, the desired viscosity, etc. Certain siloxane rearrangement catalysts effect the desired polymerization of the organopolysiloxane more rapidly and at lower temperatures than others. In general, the polymerization is carried out for a time sufficient to obtain a high molecular weight product of about 100,000 to 2,000,000 centipoise viscosity when measured at 25° C.

The high molecular weight product thus obtained is then treated with water to reduce its molecular weight to a viscosity of from 1,000 to 50,000 centipoises at 25° C. This can be accomplished by blowing steam across the surface of the high molecular weight product or through the polymer for a sufficient time to give the lower viscosity material (about 1,000 to 50,000 centipoises) having the desired silanol content. This product will have the general formula

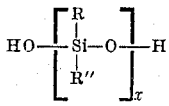

where R' and R'' have the meanings given above and $x$ is a whole number above 1, e. g., from 2 to 100 or more. There will be present two organic groups per silicon atom. Such compositions and methods for preparing the same are more particularly described in U. S. Patent 2,607,792. The use of steam in this fashion will cause a decrease in the viscosity of the polymer while at the same time the formed linear polysiloxane will have terminal silicon-bonded hydroxy groups.

An alternative method for making the linear organopolysiloxane containing terminal silicon-bonded hydroxy groups comprises adding water to the high molecular weight polymer described above in such amount that when heated at elevated temperatures, for instance, 150° to 170° C., the viscosity is reduced to the desired level of 1,000 to 50,000 centipoises. The amount of water used will vary depending upon such factors as the molecular weight of the polymer being treated, the time and temperature at which the mixture of high molecular weight organopolysiloxane and water will be heated, the ultimate viscosity desired, etc.

The amount of water used to reduce the molecular weight can be readily determined. For instance, I have found that I can obtain a linear fluid methylpolysiloxane containing terminal silicon-bonded hydroxy groups and having a viscosity of 1,000 to 2,000 centipoises by heating a high molecular weight methylpolysiloxane (prepared in accordance with the directions above) of about 2,000,000 centipoise viscosity, with 0.5 percent, by weight, thereof water for about 2 hours at 150° to 170° C.

One group of organic silicates which may be employed in the practice of the present invention (either unhydrolyzed or hydrolyzed liquid products) are those coming within the general formula

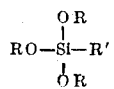

Such compounds may be varied depending on the designation of R and R' in the formula. Thus, for example, R may be methyl, ethyl, propyl, isopropyl, butyl, amyl, isoamyl, octyl, iso-octyl, decyl, dodecyl, halogenated alkyls, e. g., beta-chloroethyl, etc. radicals. R' may be the same as R including halogenated derivatives of alkyl groups, as, for example, the chlorinated, brominated, fluorinated, etc., radicals, and the number of such halogens on the alkyl group may, of course, be varied, for example, from 1 to 4 or more. In addition, R' may include alkoxy and aryloxy groups corresponding to the general formula, —OZ, where Z is, for instance, an alkyl group of the same class described above for R, or, additionally, Z may be an aryl, aralkyl, and alkaryl radical, for example, phenyl, tolyl, xylyl, benzyl, phenylethyl, naphthyl, anthracyl, biphenyl, tec., radical, as well as various halogenated derivatives of these aryl, aralkyl and alkaryl radicals, attached to the silicon atom through the medium of an oxygen atom. Thus, the halogens, for example, chlorine, bromine, etc., may be attached to any position in the alkyl group or in the aryl group and may comprise any number of halogens. When halogen is attached to an alkyl group, either in the R or R' radical, it is preferable that the halogen should not be attached to the alpha carbon atom in order to attain improved stability of such substituted alkyl groups.

As examples of monomeric organo-silicon compounds, I prefer to use organosilicates corresponding to the general formula $(RO)_4Si$, where R is an alkyl group as defined above. In addition to employing the liquid monomeric organosilicates described above in the practice of the present invention, I may also use liquid, partially hydrolyzed products derived therefrom. Such hydrolysis products are generally obtained by effecting partial hydrolysis in water of the particular monomeric organosilicate in the presence of small amounts of acid to a point where it is still water-insoluble and it is still possible to isolate a liquid, partially hydrolyzed organosilicon compound. Thus, taking as a specific example the controlled partial hydrolysis of ethyl silicate having the formula $(C_2H_5O)_4Si$, the hydrolysis of the latter may be carried out by adding acids or acid-forming metal salts to the liquid monomeric organosilicate, for instance, $FeCl_3$, $CuCl_2$, $AlCl_3$, $SnCl_4$, etc., and thereafter effecting suitable hydrolysis of this mixture of ingredients in water to obtain the two-phase composition from which the water-insoluble, partially hydrolyzed organosilicate can readily be separated from the aqueous phase and catalyst.

I have found that only certain metallic salts of organic carboxylic acids may be employed in the practice of the present invention to give satisfactory cures. Examples of suitable acid radicals are those yielding the resinate, linoleate, stearate, oleate, or even the lower acid radicals such as those yielding the acetate, the butyrate, octoate, etc. Metallic salts of naphthenic acid especially are suitable. The metal ion of the metal salt is one selected from the class consisting of lead, tin, zirconium, antimony, iron, cadmium, barium, calcium, titanium, bismuth, and manganese. Examples of such salts may be, for instance, tin naphthenate, lead octoate, tin octoate, iron stearate, tin oleate, antimony octoate, tin butyrate, etc. The soluble salts, that is, salts which are soluble in the organopolysiloxane containing terminal silicon-bonded hydroxy groups, are preferred, as, for example, lead and tin salts especially, because of their marked catalytic activity in combination with the alkyl silicate.

It was entirely unexpected and in no way could be predicted that these metallic salts in combination with the alkyl silicate and the organopolysiloxane containing terminal silicon-bonded hydroxy groups could be caused to cure at room temperature because other metallic salts which might be expected to act in the same way failed to give any satisfactory cure. Thus, it was found that zinc salts, such as zinc octoate, zinc naphthenate, and zinc stearate, even in high concentrations of the zinc ion, failed to give any cure in the above mixtures of ingredients. The zinc salts of organic acids are now and have in the past been known to be good cure accelerators for organopolysiloxane resins, and it was unexpected to find that in the mixture of inegrdients described above, they exercised no curing activity. Moreover, other metallic salts which might be expected to effect the cure such as cobalt oleate, cobalt naphthenate, manganese naphthenate, nickel naphthenate, calcium stearate, etc., also did not impart any cure to the mixture of the alkyl silicate and the above-mentioned convertible hydroxy-containing organopolysiloxane.

The amounts of the alkyl silicate and the metallic salt employed in the practice of the invention may be varied within fairly wide limits. Generally, I have found that the alkyl silicate is advantageously present, by weight, in an amount equal to from 0.1 to 5 to 10 percent or more, based on the weight of the organopolysiloxane containing the terminal silicon-bonded hydroxy groups, while the metal ion in the form of the metallic salt is present, by weight, in an amount equal to from 0.1 to 5 percent of the weight of the organopolysiloxane containing silicon-bonded hydroxyl groups. With regard to the weight ratio between the alkyl silicate and the metallic salts, generally one may use, by weight, from 0.1 to 3 parts of the metallic salt per part of the alkyl silicate.

Various fillers may be incorporated in the mixture of ingredients. Among such fillers are, for instance, titanium dioxide, lithopone, zinc oxide, zirconium silicate, silica aerogel, iron oxide, diatomaceous earth, calcium carbonate, fume silica, precipitated silica, glass fibers, etc. The amount of filler used may obviously be varied within wide limits, for instance, from about 10 to about 300 percent, by weight of the filler, based on the weight of the organopolysiloxane containing terminal silicon-bonded hydroxy groups. The exact amount of filler used will depend upon such factors as, for instance, the application with which the organopolysiloxane is intended, the type of filler employed (i. e., density of the filler), the type of convertible organopolysiloxane employed, etc.

In order to prepare the compositions herein described, it is only necessary to mix the ingredients, preferably adding the metallic salt and the alkyl silicate last, since shortly after incorporation of these last ingredients in the organopolysiloxane containing terminal silicon-bonded hydroxy groups, setting up of the mixture of ingredients will begin to take place. In a matter of a few minutes, a tight cure will begin to be noticed, and within one to two hours the ultimate cure at room temperature will be attained. The products thus derived have good tensile strengths and elongations and can be heated at elevated temperatures of about 150° to 250° C. for extended periods of time without any apparent decrease in the properties of the products.

In order that those skilled in the art may better understand how the present invention may be practiced, the following examples are given by way of illustration and not by way of limitation. All parts are by weight.

EXAMPLE 1

100 parts of octamethylcyclotetrasiloxane was heated for about 2 to 4 hours at a temperature of about 140° C. with about 0.01 percent, by weight, of potassium hydroxide until a highly viscous mass bordering on a gummy solid was obtained. This linear, long-chain methylpolysiloxane had a viscosity of about 2,000,000 centipoises, and had a ratio of approximately two methyl groups per silicon atom. This high molecular weight methylpolysiloxane was mixed with 0.5 percent, by weight, thereof water, and the mixture of ingredients heated with stirring for two hours at 150° to 175° C. until a product having a viscosity of about 2,000 centipoises (at about 30° C.) was obtained. This material was a linear, fluid methylpolysiloxane having terminal silicon-bonded hydroxyl groups. To 100 parts of this low molecular weight polymer were added 20 parts diatomaceous earth, 20 parts zinc oxide and 30 parts calcined clay. To the above mixture of ingredients were added 2 parts of a liquid, water-insoluble hydrolysis product of partial tetra-ethyl silicate and 2 parts tin octoate (0.6 part tin). The latter polyethyl silicate is sold by Carbide and Carbon Chemicals Corporation of New York, N. Y., under the name of Ethyl Silicate 40 and is a mixture of ethyl polysilicates having about 40 percent available silica and is derived from the controlled hydrolysis of tetraethyl silicate, the formula for said polyethyl silicate being described as follows:

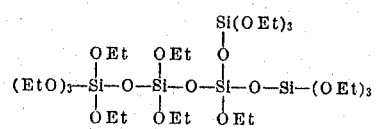

where Et represents the $C_2H_5$ group. [Additional information for making the partial hydrolysis products of the monomeric organo-silicon compounds described above may be found in the article by H. D. Hogan and C. A. Setterstrom entitled "Ethyl silicates" in Industrial and Engineering Chemistry, volume 39, page 1364, No. 11 (1947).] The above mixture of ingredients became elastic in approximately 60 seconds after mixing, whereas before this time it was a readily deformable incoherent mass, and set to a firm, rubbery product having good strength and elongation in about 5 minutes. The tensile strength after 24 hours at room temperature was 372 p. s. i., the elongation was 170 percent, and the Shore A hardness was 40. It was capable of being heated at 250° C. for 24 hours without apparent change in physical properties.

The importance of having terminal hydroxyl groups is shown in the following example where the organopolysiloxane used was a linear dimethyl polysiloxane containing terminal trimethylsilyl groups and had a viscosity of about 300 centipoises when measured around 50° C. Chain-stopped compositions of this type are more particularly described in Patnode Patents 2,469,888 and 2,469,890.

EXAMPLE 2

To 100 parts of the above-mentioned linear trimethylsilyl chain-stopped methylpolysiloxane were added 1 part of the polyethyl silicate more particularly described in Example 1 and 2.4 parts tin as tin octoate. The mixture of ingredients was allowed to remain at room temperature (25° to 30° C.) for 24 hours. At the end of this time no apparent change in viscosity had taken place and no evidence of cure could be found.

EXAMPLE 3

In this example, various metallic salts were added to the convertible methylpolysiloxane containing terminal silicon-bonded hydroxyl groups described in Example 1 employing different concentrations of metal in the form of the metallic salt. The ingredients other than the metallic salt were present, by weight, in an amount equal to 100 parts of the convertible hydroxy-containing methylpolysiloxane and 1 part of the polyethyl silicate more particularly described in Example 1. In the following Table I are listed the type of metallic salt used, the concentration of metal in the convertible methylpolysiloxane, the time or pot life (where determined) within which the mixture of ingredients showed no evidence of gelling, and the time within which a satisfactory cure (as evidenced by the increased toughness and tensile strength of the cured product) took place. In all instances the octoate were salts of 2-ethyl-hexanoic acid.

*Table I*

| Sample No. | Metallic Salt | Parts Metal | Pot Life | Time For Cure, Hours |
|---|---|---|---|---|
| 1 | Stannous octoate | 0.56 | 2 minutes | 0.25 |
| 2 | ____do____ | 1.12 | ____do____ | 0.25 |
| 3 | ____do____ | 2.24 | ____do____ | 0.25 |
| 4 | Tin naphthenate | 0.38 | ____do____ | 0.25 |
| 5 | Tin oleate | 0.32 | ____do____ | 0.25 |
| 6 | Plumbous octoate | 0.48 | 1 hour | 24 |
| 7 | Plumbic tetraoctoate | 0.32 | ____do____ | 24 |
| 8 | Zirconium octoate | 0.24 | 2-4 hours | 120 |
| 9 | ____do____ | 0.12 | Greater than 2 hours. | 120 |
| 10 | Antimony octoate | 0.36 | 2 hours | 120 |
| 11 | Iron octoate | 0.12 | 6 hours | 24 |
| 12 | Cadmium octoate | 0.32 | Greater than 2 hours. | 120 |
| 13 | Barium octoate | 0.32 | 24 hours | 48 |
| 14 | Calcium octoate | 0.1 | ____do____ | 120 |
| 15 | Titanium naphthenate | 0.6 | 6 hours | 120 |
| 16 | Bismuth naphthenate | 0.16 | ____do____ | 48 |
| 17 | Manganese octoate | 0.12 | ____do____ | 24 |

The importance of having a low molecular weight organopolysiloxane containing terminal silicon-bonded hydroxy groups is further illustrated by the following two examples in which the ratio of organic groups, specifically methyl groups, per silicon atom, was two.

EXAMPLE 4

150 parts octamethylcyclotetrasiloxane was mixed with 4 parts of the polyethyl silicate, more particularly described in Example 1, and 1.7 parts tin in the form of tin octoate. After allowing the mixture of ingredients to remain at room temperature for 24 hours or more, no apparent cure had developed, nor was there evidence of any change in viscosity of the mixture.

EXAMPLE 5

To 100 parts of the high molecular weight methylpolysiloxane described in Example 1 (having a viscosity of about 2,000,000 centipoises and obtained by condensing octamethylcyclotetrasiloxane with potassium hydroxide as described in the aforesaid Example 1) were added 30 parts calcined clay, 20 parts diatomaceous earth, 20 parts zinc oxide, 8 parts of the polyethyl silicate described in Example 1, and 0.5 part tin as tin octoate. This mixture of ingredients was pressed into the form of sheets at room temperature (about 25-30° C.) and allowed to remain at room temperature for 24 hours. At the end of this time, the samples were tested and found to have a durometer on the Shore A hardness scale of 19, a tensile strength of 215 p. s. i. and an elongation of 530 percent. The physical properties of this composition are to be compared with the physical properties of the cured composition obtained from the low molecular weight hydroxy-containing methylpolysiloxane described in Example 1, where the latter example had a Shore A hardness of 40, a tensile strength of 372 p. s. i. and an elongation of 170 percent.

In addition to the tensile strength of the product described in Example 1 being about 80 percent greater and the percent elongation being more than adequate for most applications, the most significant, unexpected feature in using the low molecular weight, linear, fluid organopolysiloxane containing terminal silicon-bonded hydroxy groups was the durometer hardness of 40 which was obtained, as contrasted with the durometer hardness (on the Shore A scale) of 19 of the product of the above Example 5. With rare exception the most useful durometer hardness is around 40 or higher, and the fact that the high molecular weight methylpolysiloxane unexpectedly had a durometer of 19 would mean that this latter project would have little utility in most applications. To these advantages should be added the advantages of fluidity of compositions containing the low molecular, linear, organopolysiloxanes containing terminal silicon-bonded hydroxy groups which can be more readily introduced, because of their fluidity, into areas and locations where the substantially non-flowable, high molecular weight product described in Example 5 cannot be satisfactorily used.

It will, of course, be apparent to those skilled in the art that other convertible organopolysiloxanes having terminal silicon-bonded hydroxyl groups, as well as other alkyl silicates (which term includes alkyl polysilicates), many examples of which have been described above, may be used in place of the convertible methyl polysiloxane and polyethyl silicate used in the foregoing examples. In addition, other fillers, as well as other types of metallic salts, may be employed in place of those described in the preceding examples, again without departing from the scope of the invention. Concentrations and proportions of ingredients may obviously be varied as is described earlier to give faster or slower cures depending on the application involved.

The compositions herein described have many applications. One of the applications for which they can and have been used is in connection with dental impressions. Because of the inertness of the materials involved, plugs of the convertible organopolysiloxane, a filler, the metallic salt of the organic carboxylic acid, and the alkyl silicate may be placed in a patient's mouth and an impression made of either his teeth or his gums, the impression removed and allowed to harden at room temperature. This cast can then be used to make plates for the patient.

Another application for which the materials of the above invention have been used is in connection with sealers for joints between adjacent sections of highways, particularly those made of concrete. It is known that concrete highways undergo considerable expansion and contraction with extremes in temperature. Because of this, the surface of the highway is sectioned, and in order to accommodate this expansion and contraction of each of the sections, it has been necessary to interpose suitable joint material, such as strips of tar, which can compensate for the contraction and expansion without allowing undue amounts of water to seep in between the sections of concrete so as to undermine the latter and, of course, cause breakdown of the concrete highway surface.

The compositions herein described, because of their ability to cure at normal temperatures, can be advantageously employed as highway joints. For instance, a mixture of ingredients containing the convertible organopolysiloxane, a filler, the metallic salt of the organic carboxylic acid and the alkyl silicate are intimately mixed (e. g., in the form of an aqueous or alcohol dispersion) with strands of glass fibers and made into the form of a rope. This treated rope can be readily pushed down into the joint between adjacent sections of the concrete highway. Shortly after insertion in the joint, the convertible organopolysiloxane will set up and become tough and flexible. If desired, dispersions of the ingredients used to treat the glass fibers can be poured into the joint to further seal the joint. Because of the known inertness of silicone rubber to extremes in temperature, there is little, if any, deterioration of the joint with the variation in the seasons, while at the same time permitting the joint to accept the expansion and contraction of the adjacent layers of concrete without material change in the effectiveness of the joint. Also, because of the water repellency of silicones, little, if any, water is able to by-pass the joint and, therefore, an exceptionally watertight seal is obtained. Moreover, it has been found that the compositions described above seem to have an affinity for concrete and appear to bond quite readily to the concrete. In addition, because of the ability to pigment the joint sealer with pigments which can readily blend with the concrete highway, it is possible to obtain joints which are not readily discernible from the main concrete highway surface.

In addition to the above uses, the compositions herein described are highly useful as insulation material for electrical components (encapsulation), gasket materials, shock absorbers, and for the other applications for which known natural synthetic rubbers are not suitable. The use of room temperature, curable, silicone rubber permits curing of the silicone rubber in situ in many instances in applications where it is not practical to subject curable silicone rubber to heat cure. Additionally, the compositions herein described can be used as adhesives and especially when adhering polyethylene; the presently claimed compositions are especially tenacious and adhesive to polyethylene surfaces.

What I claim as new and desire to secure by Letters Patent of the United States is:

1. The cured composition obtained from a mixture of ingredients comprising (1) a linear, fluid organopolysiloxane containing terminal silicon-bonded hydroxy groups convertible to the cured, solid, elastic state and having a viscosity of from 1,000 to 50,000 centipoises when measured at 25° C., the organic groups of the aforesaid organopolysiloxane being selected from the class consisting of monovalent hydrocarbon radicals and halogenated aryl radicals attached to silicon by carbon-silicon linkages, (2) an alkyl silicate selected from the class consisting of (a) monomeric organosilicates corresponding to the general formula

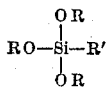

where R and R' are members selected from the class consisting of alkyl groups and halogen-substituted alkyl groups, and R', in addition, represents a member selected from the class consisting of aryl, aralkyl, alkaryl, alkoxy, aryloxy groups, and halogenated derivatives of the aforesaid aryl, aralkyl, alkaryl, alkoxy and aryloxy groups and (b) liquid partial hydrolysis products of the aforementioned organosilicate monomeric compounds, and (3) a metallic salt of an organic monocarboxylic acid in which the metal ion is selected from the class consisting of lead, tin, zirconium, antimony, iron, cadmium, barium, calcium, titanium, bismuth and manganese.

2. The cured composition obtained from a mixture of ingredients comprising (1) a linear, fluid organopolysiloxane containing terminal silicon-bonded hydroxy groups and convertible to the cured, solid, elastic state and having a viscosity of from 1,000 to 50,000 centipoises when measured at 25° C., the organic groups of the aforesaid organopolysiloxane being selected from the class consisting of monovalent hydrocarbon radicals and halogenated aryl radicals attached to silicon by carbon-silicon linkages, (2) an alkyl silicate selected from the class consisting of (a) monomeric organosilicates corresponding to the general formula

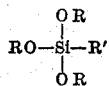

where R and R' are members selected from the class consisting of alkyl groups and halogen-substituted alkyl groups, and R', in addition, represents a member selected from the class consisting of aryl, aralkyl, alkaryl, alkoxy, aryloxy groups, and halogenated derivatives of the aforesaid aryl, aralkyl, alkaryl, alkoxy, and aryloxy groups, and (b) liquid partial hydrolysis products of the aforementioned organosilicate monomeric compounds, (3) a metallic salt of an organic monocarboxylic acid in which the metal ion is selected from the class consisting of lead, tin, zirconium, antimony, iron, cadmium, barium, calcium, titanium, bismuth and manganese, and (4) a filler.

3. The cured composition obtained from a mixture of ingredients comprising (1) a linear, fluid methylpolysiloxane containing terminal silicon-bonded hydroxy groups and having a viscosity of from 1,000 to 50,000 centipoises when measured at 25° C., (2) polyethyl silicate, (3) a tin salt of an organic monocarboxylic acid, and (4) a finely divided silicate filler, the polyethyl silicate and tin salt each being present, by weight, in an amount equal to from 0.1 to 5 percent of the weight of (1).

4. The process for obtaining a composition of matter which can be converted at relatively low temperatures to the cured, solid, elastic state, which process comprises forming a mixture of ingredients comprising (1) a linear fluid organopolysiloxane containing terminal silicon-bonded hydroxy groups convertible to the cured, solid, elastic state and having a viscosity of from 1,000 to 50,000 centipoises when measured at 25° C., the organic groups of the aforesaid organopolysiloxane being selected from the class consisting of monovalent hydrocarbon radicals and halogenated aryl radicals attached to silicon by carbon-silicon linkages, (2) an alkyl silicate selected from the class consisting of (a) monomeric organosilicates corresponding to the general formula

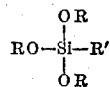

where R and R' are members selected from the class consisting of alkyl groups and halogen-substituted alkyl groups, and R', in addition, represents a member selected from the class consisting of aryl, aralkyl, alkaryl, alkoxy, aryloxy groups, and halogenated derivatives of the aforesaid aryl, aralkyl, alkaryl, alkoxy and aryloxy groups and (b) liquid partial hydrolysis products of the aforementioned organosilicate monomeric compounds and (3) a metallic salt of an organic monocarboxylic acid in which the metal ion is selected from the class consisting of lead, tin, zirconium, antimony, iron, cadmium, barium, calcium, titanium, bismuth and manganese, and allowing the cure to take place at room temperature.

5. The process as in claim 4 in which the linear fluid organopolysiloxane is a methylpolysiloxane and the alkyl silicate is polyethylsilicate.

6. The process as in claim 5 in which the metallic salt is a tin salt.

7. The process as in claim 5 in which the metallic salt is a lead salt.

8. The process for making a composition of matter which can be converted at relatively low temperatures to the cured, solid elastic state, which process comprises forming a mixture of ingredients comprising (1) a linear, fluid methylpolysiloxane containing terminal silicon-bonded hydroxy groups and having a viscosity of from 1,000 to 50,000 centipoises when measured at 25° C., (2) polyethyl silicate, (3) a tin salt of an organic monocarboxylic acid, and (4) a finely divided silica filler, the polyethyl silicate and tin salt each being present, by weight, in an amount equal to from 0.1 to 5 percent of the weight of (1), and allowing the cure to take place at room temperature.

References Cited in the file of this patent

UNITED STATES PATENTS

| 2,744,878 | Smith-Johannsen | May 8, 1956 |
| 2,759,904 | Talcott | Aug. 21, 1956 |

FOREIGN PATENTS

| 460,878 | Canada | Nov. 8, 1949 |

UNITED STATES PATENT OFFICE
CERTIFICATE OF CORRECTION

Patent No. 2,843,555                                                      July 15, 1958

Charles A. Berridge

It is hereby certified that error appears in the printed specification of the above numbered patent requiring correction and that the said Letters Patent should read as corrected below.

Column 9, line 54, for "divided silicate" read -- divided silica --.

Signed and sealed this 16th day of September 1958.

(SEAL)
Attest:

KARL H. AXLINE                                          ROBERT C. WATSON
Attesting Officer                                        Commissioner of Patents